United States Patent Office 2,752,249
Patented June 26, 1956

2,752,249
SUBSTITUTED 1,3-DITHIANYL PENTANOIC ACIDS

George H. Latham, Forwood, Del., Charles W. Todd, Westtown, Pa., and Winston J. Wayne, Centerville, Del., assignors to E. I. du Pont de Nemours & Company, Wilmington, Del., a corporation of Delaware No Drawing. Application October 6, 1953, Serial No. 384,512

12 Claims. (Cl. 99—163)

This invention relates to new compositions of matter and, more particularly, to a new class of biologically active organic compounds.

α-Lipoic acid, the dextrorotary form of 5-(1,2-dithiolane-3-yl)pentanoic acid, is a vitamin-like material intimately associated with the nutritional needs of various types of microorganisms ("Present knowledge of lipoic acid," Nutrition Reviews 11, 59 (1953)). This newly recognized vitamin is not stable to oxidation and accordingly a more stable material exhibiting the biological activity of lipoic acid is desirable.

This invention has as an object the preparation of new compounds. A further object is the preparation of new materials capable of replacing lipoic acid in biological systems. Another object is the preparation of new inhibitors of rancidification for use in fats and oils. Still another object is the preparation of edible glyceride compositions of greater stability towards rancidification. Other objects will appear hereinafter.

These objects are accomplished by the present invention of 5-(1,3-dithiane-4-yl)pentanoic acids and their derivatives of the formula

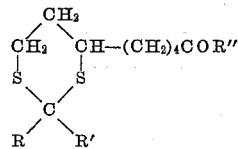

in which R and R' are hydrogen, monovalent hydrocarbon radicals or together form a divalent hydrocarbon radical, and R" is hydroxyl or a radical hydrolyzable thereto. These compounds are much more stable to oxidation than is α-lipoic acid and further are highly useful as replacements for lipoic acid.

The 5-(1,3-dithiane-4-yl)pentanoic acids of this invention are prepared by the reaction of 6,8-dimercaptooctanoic acid with an oxo compound, i. e., an aldehyde or ketone, in the presence of hydrogen chloride. The resulting mercaptal or mercaptol is isolated and purified by recrystallization, distillation or extraction with an organic solvent. 6,8-dimercaptooctanoic acid may be prepared by the method of the copending Acker and Todd application Ser. No. 325,236, filed December 10, 1952.

The following examples in which parts are by weight are illustrative of the invention. The term "N. E." below is used to indicate neutralization equivalent.

Example I

The mercaptal, 5-(2-phenyl-1,3-dithiane-4-yl)-pentanoic acid

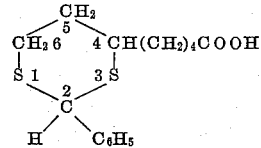

was synthesized as follows:

6,8-dimercaptooctanoic acid (500 parts), benzaldehyde (318 parts), and fused zinc chloride (50 parts) were mixed in a stoppered flask and dry hydrogen chloride gas bubbled through the mixture until it was saturated. The introduction of the hydrogen chloride caused the reaction mixture to become warm and cloudy, indicating reaction was proceeding. After standing at room temperature for two days, the reaction mixture was stirred with water and then extracted with ether. The ether was then extracted with 5% sodium hydroxide solution to dissolve acidic materials. Acidification of the sodium hydroxide solution with 5% hydrochloric acid produced a yellow oil which was extracted away from the aqueous layer with ether. This ether extract was washed with water until the washings were neutral and then dried over anhydrous sodium sulfate in the cold. After removal of the drying agent and ether, a yellow oil remained which was distilled to yield 397 parts (56% yield) of a brown syrup with B. P. 155–195° C./0.5–1.2 mm., $n_D^{25}$ 1.5681–1.5834. A middle cut with B. P. 175–195° C./0.6 mm. was analyzed.

Analysis.—Calculated for $C_{15}H_{20}O_2S_2$: C, 60.75%; H, 6.79%; S, 21.60%; N. E., 296. Found: C, 60.72%; H, 6.97%; S, 21.94%; N. E., 284.

This fraction crystallized on standing.

Example II

The mercaptol, 5-(2,2-dimethyl-1,3-dithiane-4-yl)-pentanoic acid was prepared and isolated by a procedure similar to that in Example I. 6,8-dimercaptooctanoic acid (500 parts) was reacted with acetone (175 parts) in the presence of fused zinc chloride (50 parts) and anhydrous hydrogen chloride gas. The product was distilled to yield 413 parts (69.5% yield) of a light yellow syrup with B. P. 140–152° C./0.1 mm., $n_D^{25}$ 1.5282–1.5298. A cut with B. P. 151–152° C./0.1 mm. was analyzed.

Analysis.—Calculated for $C_{11}H_{20}O_2S_2$: C, 53.1%; H, 8.10%; S, 25.80%; N. E., 248. Found: C, 53.55%; H, 8.09%; S, 26.37%; N. E. 243.

Example III 5-(2-methyl-1,3-dithiane-4-yl)-pentanoic acid was prepared as follows: 6,8-dimercaptooctanoic acid (500 parts), benzene (880 parts), and fused zinc chloride (50 parts) were mixed in a stoppered flask and cooled with an ice-salt mixture. Cold acetaldehyde (157 parts) was then added and anhydrous hydrogen chloride gas bubbled gently through the reaction mixture. The mixture became cloudy and eventually formed two layers while standing for a day at 4° C. The reaction mixture was worked up as described in Example I and the product distilled to yield 394 parts (70% yield) of a yellow syrup with B. P. 130–163° C./.06–0.2 mm. This syrup crystallized on standing and was recrystallized from cyclohexane to yield 196 parts of white solid, M. P. 84–87° C. which was analyzed.

Analysis.—Calculated for $C_{10}H_{18}O_2S_2$: C, 51.2%; H, 7.74%; S, 27.33%; N. E. 234. Found: C, 51.27%; H, 7.75%; S, 27.72%; N. E., 234.3.

Example IV

Ethyl 5-(2-methyl-1,3-dithiane-4-yl)pentanoate was prepared as follows: Ethyl 6,8-dimercaptooctanoate (500 parts), benzene (880 parts), fused zinc chloride (50 parts) were mixed and cooled with an ice-salt mixture. Cold acetaldehyde (157 parts) was then added and anhydrous hydrogen chloride gas bubbled gently through the reaction. After standing four to five hours at 4° C., the reaction mixture was stirred with water and then extracted with ether. The ether layer was extracted with 1% sodium hydroxide solution to remove acidic materials, washed with 5% hydrochloric acid and water, and dried over anhydrous sodium sulfate in the cold. After removal of the drying agent and ether, the product was distilled to yield 300 parts (54% yield) of a yellow oil with B. P. 120–136° C./0.08 mm., $n_D^{25}$ 1.5100–1.5139. A middle cut with B. P. 124–133° C./0.08 mm. was analyzed.

*Analysis.*—Calculated for $C_{12}H_{22}O_2S_2$: C, 54.9%; H, 8.44%; S, 24.41%; Sap. No., 213.5. Found: C, 55.09%; H, 8.33%; S, 24.55%; Sap. No., 216.9.

Example V 5-(2,2-diphenyl-1,3-dithiane-4-yl)pentanoic acid was prepared as follows: 6,8-dimercaptooctanoic acid (500 parts), benzophenone (437 parts), benzene (880 parts), and fused zinc chloride (50 parts) were mixed in a stoppered flask and cooled in an ice bath. Anhydrous hydrogen chloride gas was bubbled through the reaction mixture. The reaction mixture became cloudy and eventually formed two layers while standing for three days at 4° C. The reaction mixture was worked up as described in Example I except 2.5% sodium hydroxide solution was used for extracting the acidic components since 5% sodium hydroxide solution appeared to salt out a solid sodium salt. Removal of ether from the final dried solution left a light yellow syrup (about 600 parts) which did not distill at about 200° C. under 0.1 mm. reduced pressure. The original unheated light yellow syrup was analyzed.

*Analysis.*—Calculated for $C_{21}H_{24}O_2S_2$: C, 67.7%; H, 6.49%; S, 17.20%; N. E., 372.5. Found: C, 66.38%; H, 6.83%; S, 19.69%; N. E., 371.2.

Example VI 5-(1,3-dithiane-4-yl)pentanoic acid was synthesized as follows: 6,8-dimercaptooctanoic acid (50 parts), 36% aqueous formaldehyde (25 parts), and 0.1 N aqueous hydrochloric acid (250 parts) were mixed in a flask equipped with a reflux condenser and the flask flushed with nitrogen. The reaction mixture, consisting of a yellow oil layer and an aqueous layer, was refluxed for 1.5 hours. To the hot reaction mixture was then added peroxide-free dioxane (258 parts) and 36% aqueous formaldehyde (10 parts). A clear yellow homogeneous solution resulted which was refluxed for one hour and then allowed to stand at room temperature overnight. The reaction mixture, now consisting of two layers, was worked up as described in Example I. Removal of ether from the final dried solution left a yellow oil which crystallized on standing. When the product was subjected to distillation under reduced pressure, it appeared to decompose slightly at 200° C. Therefore, the attempted distillation was stopped. The product was then recrystallized from a large quantity of cyclohexane to yield 7 parts of a white powder, M. P. 97–98.5° C. This was analyzed.

*Analysis.*—Calculated for $C_9H_{16}O_2S_2$: C, 49.05%; H, 7.32%; S, 29.05%; N. E., 220. Found: C, 50.06%; H, 7.47%; S, 29.57%; N. E., 219.

Example VII

5 - [1,5 - dithiaspiro(5.5)hendecane - 2 - yl]pentanoic acid

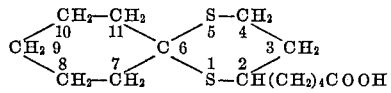

was synthesized as follows: 6,8-dimercaptooctanoic acid (500 parts), cyclohexanone (235 parts) benzene (880 parts), and fused zinc chloride (50 parts) were mixed in a stoppered flask and cooled in an ice bath. Dry hydrogen chloride gas was then bubbled through the reaction mixture. The mixture became cloudy and formed two layers while standing for three days at 4° C. The reaction mixture was worked up as described in Example I. Removal of the ether from the final dried solution left a yellow oil which crystallized. This solid was recrystallized from cyclohexane to yield 440 parts (63.5% yield) of a cream-colored solid, M. P. 104–106° C. This solid was analyzed.

*Analysis.*—Calculated for $C_{14}H_{24}O_2S_2$: C, 58.25%; H, 8.38%; S, 22.20%; N. E., 228.4. Found: C, 58.8%; H, 8.56%; S, 22.38%; N. E., 286.

Example VIII 5-(1,3-dithiane-4-yl)pentanamide was synthesized as follows: 5-(1,3-dithiane-4-yl)pentanoic acid (100 parts), anhydrous pyridine (5 parts) and anhydrous toluene (3000 parts), were mixed in a flask equipped with a nitrogen inlet, dropping funnel, and reflux condenser protected with a calcium chloride drying tube. The flask was warmed to dissolve the solid acid and anhydrous nitrogen was bubbled slowly through the solution. The solution was then cooled in an ice bath to 0–5° C. Thionyl chloride (54 parts) dissolved in anhydrous toluene (1000 parts) was then run into the cold reaction mixture. The reaction mixture was kept cold in an ice bath while anhydrous nitrogen was bubbled gently through it for 19 hours. At the end of this time a slow stream of anhydrous ammonia gas was passed over the cold, clear, slightly yellow solution of 5-(1,3-dithiane-4-yl)pentanoyl chloride. A white solid began to form immediately and the slow stream of ammonia was continued while the reaction mixture was kept cold and shaken occasionally during one hour. The reaction mixture was then allowed to warm to room temperature, mixed with water and extracted with ether. The ether extract was washed with cold 3% hydrochloric acid, cold 1% sodium hydroxide solution, and water and then dried over anyhdrous sodium sulfate. After removal of the drying agent, the ether and toluene were removed under reduced pressure at 35° C., to leave a white solid. This solid was recrystallized from absolute ethanol to yield 23 parts (23% yield) of 5-(1,3-dithiane-4-yl)pentanamide in the form of white needles, M. P. 131–132° C.

*Analysis.*—Calculated for $C_9H_{17}OS_2N$: C, 49.3%; H, 7.81%; S, 29.20%; N, 6.38%. Found: C, 50.0%; H, 7.81%; S, 27.96%; N, 6.06%.

Example IX

The sodium salt of 5-(1,3-dithiane-4-yl)pentanoic acid was prepared as follows: 5-(1,3-dithiane-4-yl)pentanoic acid (50 parts) dissolved in absolute methanol (1500 parts) has added to it 2 N sodium methoxide in absolute methanol (86 parts). To the resulting clear solution was added anhydrous ether (30,000 parts) whereupon a white gel-like solid precipitated. The solid was crushed and separated from the reaction mixture by centrifuging. The solid was then washed three times by crushing it in anhydrous ether and separating it each time by centrifuging. The gel-like solid was then freed of ether under reduced pressure at room temperature and dried in vacuo over calcium chloride to yield 46 parts (84% yield) of sodium 5-(1,3-dithiane-4-yl)-pentanoate in the form of a white powder.

*Analysis.*—Calculated for $C_9H_{15}O_2S_2Na$: S, 26.42%; Na, 9.48%. Found: S, 25.96%; Na, 9.71%.

The white solid dissolved readily in water to form a clear neutral solution.

The 5-(1,3-dithiane-4-yl)pentanoic acids of the present invention have, among their many utilities, the valuable property, when added to glycerides, i. e., fats and oils, of enhancing their stability towards, i. e., reducing the tendency towards, rancidification. This property is exemplified in Examples A and B below which clearly illustrate the excellent stabilization against rancidity of edible corn oil and lard imparted by 1% of the tested compounds.

Example A

A 50% solution of corn oil in benzene was divided into three portions. One portion (Code 1) was kept as a control, a second portion (Code 2) was stabilized by the addition of 1% (of the weight of the corn oil) of 5-(2,2-dimethyl-1,3-dithiane-4-yl)pentanoic acid, and the third portion (Code 3) was stabilized by the addition of 1% (of the weight of the corn oil) of 5-(2-phenyl-1,3-dithiane-4-yl)pentanoic acid. Pieces of filter paper were impregnated with the clear solutions, excess solution blotted off, and the filter paper air-dried for fifteen minutes. The papers were then placed in separate, closed glass bottles which were stored in a 65° C. oven. The bottles were opened daily and examined for the development of rancid odor. The times for the initial detection of a slight odor of rancidity and for the development of a strong odor of rancidity are noted in the following table.

| Coating on Paper | Sol'n Code | Days Required for Rancidity to Develop at 65° C. | |
|---|---|---|---|
| | | Slight Rancidity | Strong Rancidity |
| Corn Oil (control) | 1 | 4 | 5 |
| Corn Oil + 1% 5-(2,2-dimethyl-1,3-dithiane-4-yl)pentanoic acid | 2 | 23 | 24 |
| Corn Oil + 1% 5-(2-phenyl-1,3-dithiane-4-yl)pentanoic acid | 3 | | 35 |

Corn oil specimens stabilized respectively by the addition of 1% of 5-(1,3-dithiane-4-yl)pentanoic acid, 1% of 5-(2-methyl-1,3-dithiane-4-yl)pentanoic acid and 1% of 5-[1,5-dithiaspiro(5.5)hendecane-2-yl]pentanoic acid showed similar improvement in resistance to rancidification over the control when tested as above.

*Example B*

A 50% solution of lard in benzene was divided into three portions. One portion (Code 4) was kept as a control, a second portion (Code 5) was stabilized by the addition of 1% (of the weight of the lard) of 5-(2-phenyl-1,3-dithiane-4-yl)pentanoic acid, and the third portion (Code 6) was stabilized by the addition of 1% (of the weight of the lard) of 5-(2,2-dimethyl-1,3-dithiane-4-yl)pentanoic acid. Filter papers impregnated with the three solutions were tested for the development of rancidity at 65° C. as described above. The results are given in the following table.

| Coating on Paper | Sol'n Code | Days Required for Rancidity to Develop at 65° C. | |
|---|---|---|---|
| | | Slight Rancidity | Strong Rancidity |
| Lard (control) | 4 | 4 | 6 |
| Lard + 1% 5-(2-phenyl-1,3-dithiane-4-yl)pentanoic acid | 5 | (¹) | (¹) |
| Lard + 1% 5-(2,2-dimethyl-1,3-dithiane-4-yl)pentanoic acid | 6 | (¹) | (¹) |

¹ No rancid odor after 60 days.

While the rancidification inhibitive effect of the compounds of the present invention on corn oil and lard has been illustrated above the inhibition is generic to glycerides subject to rancidification including animal fats, such as butter, tallow, fish liver oil, fish oils, and whale oil; vegetable fats and oils, such as coconut oil, palm oil, soybean oil, cocoa butter, olive oil, cottonseed oil, peanut oil, sunflower seed oil, castor oil, and partly hydrogenated oils of these kinds.

In spite of the fact that the dithianes of the present invention differ so sharply from lipoic acid in resistance to oxidation, these dithianes possess to a remarkable degree the ability to activate the oxidative decarboxylation of pyruvic acid by dried cells of *Streptococcus faecalis* 10C1. This is a most unexpected result since activation of this oxidative degradation has been shown as a specific assay for lipoic acid (Gunsalus, Dolin and Struglia, J. Biol. Chem., 194, 849–857 (1952)). As is common in the field of biochemistry, this test is so highly specific that only one optical isomer of 5-(1,2-dithiolane-3-yl)pentanoic acid responds to it, the other optical isomer, as closely related a chemical as can be visualized, being inactive. It is therefore most surprising that the 1,3-dithianes of the present invention, compounds in which the heterocyclic ring contains two thioether functional groups completely separated by hydrocarbon structure, should show a biological activity resembling that shown by a 1,2-dithiolane, a compound in which the heterocyclic ring contains a single disulfide functional group. This result leads to speculation as to whether the 1,3-dithiane may in some way be metabolized to lipoic acid by the *Streptococcus faecalis* 10C1, but no information is available on this point and applicants do not wish to be limited by such speculation.

The activation of the oxidative decarboxylation of pyruvic acid by the products of the present invention in the test of Gunsalus et al. is shown in the following table:

| Activator | Weight of Activator (mμg.) | Oxygen Uptake ¹ μl/hr. |
|---|---|---|
| Lipoic acid | 1 | 28 |
| | 10 | 94 |
| 5-(2-methyl-1,3-dithiane-4-yl)-pentanoic acid | 5 | 22 |
| 5-(2,2-dimethyl-1,3-dithiane-4-yl)pentanoic acid | 5 | 23 |
| 5-(1,3-dithiane-4-yl)pentanoic acid | 5 | 27 |
| 5-[1,5-dithiaspiro(5.5)hendecane-2-yl]pentanoic acid | 5 | 18 |
| Ethyl 5-(2-methyl-1,3-dithiane-4-yl)pentanoate | 6 | 37 |

¹ Over and above the oxygen uptake of a simultaneous blank containing no activator.

The present invention is generic to compounds of the formula

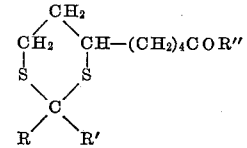

wherein each of R and R' are hydrogen or a monovalent hydrocarbon radical or R and R' together form a divalent hydrocarbon radical. When either or both R's are hydrocarbon they are preferably free from non-aromatic unsaturation and R'' is hydroxyl or a radical hydrolyzable thereto.

The free acids of the present invention are converted to their metal salts by dissolving the acid in an anhydrous alcohol such as methanol and adding a metal alkoxide such as sodium methylate, whereupon the metal salt of the acid is precipitated. Ammonium salts of the free acids of the present invention are prepared by adding anhydrous ammonia to an ether solution of the free acid. The free acids are converted to the acid chlorides by treatment with thionyl chloride in solution in aromatic hydrocarbons. The resulting acid chlorides are converted to amides by treatment with ammonia or amines in aromatic hydrocarbon solution. The acid chlorides are converted to esters by treatment with alcohols in aromatic hydrocarbon solution.

The products of the present invention can be prepared as illustrated in the examples, by the reaction of an oxo compound RCOR' wherein R and R' are each hydrogen or a monovalent hydrocarbon radical. Thus formaldehyde, acetaldehyde and alkanals in general; acetone and alkanones in general; benzaldehyde and arenals in general; benzophenone and other arenones in general; cyclohexanone and cycloalkanones in general can be employed. The substituents, R and R', on the carbonyl, when not hydrogen, are hydrocarbon either one monovalent or two monovalent or one divalent hydrocarbon radical. The hydrocarbon radicals are preferably free from non-aromatic, i. e., non-benzenoid, unsaturation but unsaturated oxo compounds, e. g., cyclohexenone, methyl vinyl ketone, acrolein, cinnamaldehyde, or acraldehyde can be used, thus furnishing unsaturated hydrocarbon radicals on the dithiane-pentanoic acid.

The reaction for the formation of the products of this invention can be carried out in the absence of a solvent, as in Examples I and II, in the presence of an inert organic solvent, as in Examples III, IV, V, and VII, or in the presence of water, as in Example VI. It should be noted that, in each case as the reaction proceeds, water is given off so that, regardless of the starting conditions, the reacting system does not remain anhydrous. The use of an acidic catalyst as illustrated by hydrogen chloride in Example VI and by a combination of zinc chloride and hydrogen chloride in Examples I–V and VII is optional. The use of a catalyst is preferred since it leads to improved yields in shorter times, but the formation of mercaptals and mercaptols as in these examples takes place in the absence of such a catalyst.

The temperature employed in the above reactions can be varied widely. In general, fewer side reactions are encountered when the reactions are carried out at temperatures below room temperature, although temperatures up to the boiling point of the reaction mixture may be employed.

The term "carboxylic" in the claims is used in the Patent Office sense (C. B. 78, p. 19) to designate the —COO— radical, i. e., that of acids, esters, anhydrides, and salts. See also C. B. 74, p. 28; C. B. 200, pp. 260–1; C. B. 85, p. 7.

The term "spirocarbon" designates the one carbon common to the two ring structures of a spiro compound.

The term "oxo" denotes the presence of a carbonyl (C=O) bonded to hydrogen and/or carbon and is a term generic to aldehydes and ketones (Classification Bulletin 200, pages 260–264).

The foregoing detailed description has been given for clearness of understanding only and no unnecessary limitations are to be understood therefrom. The invention is not limited to the exact details shown and described for obvious modifications will occur to those skilled in the art.

What is claimed is:

1. A carboxylic heterocyclic compound of the formula

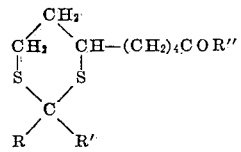

wherein R″ is selected from the class consisting of the carboxylic hydroxyl group and groups hydrolyzable to such hydroxyl group and R and R′ when taken separately are selected from the class consisting of hydrogen and monovalent hydrocarbon radicals of not more than eight carbons and when taken together form a divalent hydrocarbon radical of not more than eight carbons.

2. A 1,3-dithiane having on the four carbon a normal butyl substituent with a carboxylic group on the carbon furthest removed from the ring and having the extranuclear valences of carbons 4, 5, and 6 otherwise satisfied by hydrogen.

3. A 1,3-dithiane having on the four carbon a normal butyl substituent with a carboxylic group on the carbon furthest removed from the ring and having the extranuclear valences of carbons 2, 4, 5, and 6 otherwise satisfied by hydrogen.

4. A 1,3-dithiane having on the four carbon a normal butyl substituent with a carboxylic group on the carbon furthest removed from the ring, having the extranuclear valences of carbons 4, 5, and 6 otherwise satisfied by hydrogen, and having, on the 2 carbon, a monovalent hydrocarbon radical free from non-benzenoid unsaturation.

5. A 1,3-dithiane having on the four carbon a normal butyl substituent with a carboxylic group on the carbon furthest removed from the ring, having the extranuclear valences of carbons 4, 5, and 6 otherwise satisfied by hydrogen and having the 2 carbon a spirocarbon, i. e., the sole carbon common to the dithane ring and to a second ring, said second ring being hydrocarbon of not more than eight carbons.

6. A compound of the formula

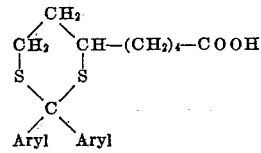

wherein Aryl denotes a monovalent mononuclear hydrocarbon radical with its free valence stemming from carbon of the nucleus.

7. Process wherein a member of the class consisting of 6,8-dimercaptooctanoic acid and esters thereof is reacted with an oxo compound whereby a member of the class consisting of 5-(1,3-dithiane-4-yl)pentanoic acid and esters thereof is obtained.

8. An edible glyceride containing a minor amount, effective to repress the rancidification of said edible glyceride, of a 5-(1,3-dithiane-4-yl)pentanoic acid compound of the formula

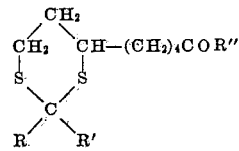

wherein R″ is selected from the class consisting of the carboxylic hydroxyl group and groups hydrolyzable to such hydroxyl group and R and R′ when taken separately are selected from the class consisting of hydrogen and monovalent hydrocarbon radicals of not more than eight carbons and when taken together form a divalent hydrocarbon radical of not more than eight carbons.

9. A 1,3-dithiane having on the four carbon a normal butyl substituent with a carboxylic group on the carbon furthest removed from the ring, having one extranuclear hydrocarbon radical of not more than eight carbons on position 2 and having the extranuclear valences of carbons 4, 5, and 6 otherwise satisfied by hydrogen.

10. A 1,3-dithiane having on the four carbon a normal butyl substituent with a carboxylic group on the carbon furthest removed from the ring, having two extranuclear hydrocarbon radicals of not more than eight carbons on position 2 and having the extranuclear valences of carbons 4, 5, and 6 otherwise satisfied by hydrogen.

11. A 1,3-dithiane having on the four carbon a normal butyl substituent with a carboxylic group on the carbon furthest removed from the ring, having the extranuclear valences of carbons 4, 5, and 6 otherwise satisfied by hydrogen, and having, on the 2 carbon, two lower alkyl radicals.

12. A 1,3-dithiane having on the four carbon a normal butyl substituent with a carboxylic group on the carbon furthest removed from the ring, having the extranuclear valences of carbons 4, 5, and 6 otherwise satisfied by hydrogen, and having, on the 2 carbon, two mononuclear aryl radicals.

References Cited in the file of this patent

UNITED STATES PATENTS 2,559,626    Jansen _____ July 10, 1951